United States Patent [19]

Hanson et al.

[11] Patent Number: 5,600,712
[45] Date of Patent: Feb. 4, 1997

[54] ENABLING TECHNIQUE FOR QUICKLY ESTABLISHING HIGH SPEED PSTN CONNECTIONS IN TELECOMMUTING APPLICATIONS

[75] Inventors: Bruce L. Hanson, Little Silver, N.J.; Kurt E. Holmquist, Largo, Fla.; Lee B. Strahs, Colts Neck, N.J.

[73] Assignee: Paradyne Corporation, Largo, Fla.

[21] Appl. No.: 628,410

[22] Filed: Apr. 5, 1996

Related U.S. Application Data

[63] Continuation of Ser. No. 333,686, Nov. 3, 1994, abandoned.

[51] Int. Cl.[6] .......................... H04M 1/57; H04M 11/06; H03H 7/30
[52] U.S. Cl. ........................ 379/142; 379/93; 375/231
[58] Field of Search ................... 379/91, 90, 93, 379/94, 97, 98, 100, 112, 142; 375/229, 230, 231, 232

[56] References Cited

U.S. PATENT DOCUMENTS

| | | | |
|---|---|---|---|
| 4,285,061 | 8/1981 | Ho | 375/231 |
| 4,416,015 | 11/1983 | Gitlin | 375/231 |
| 4,489,416 | 12/1984 | Stuart | 375/231 |
| 5,301,246 | 4/1994 | Archibald et a. | 380/23 |
| 5,333,186 | 7/1994 | Gupta | 379/201 |
| 5,343,516 | 8/1994 | Callele et al. | 379/142 X |

OTHER PUBLICATIONS

Patent Application—Serial No. 08/216373 filed Mar. 23, 1994, "Independently Switched Voice and Data Calls Using A Simultaneous voice and Data Modem".

*Primary Examiner*—Wellington Chin
*Assistant Examiner*—Paul Loomis
*Attorney, Agent, or Firm*—Thomas, Kayden, Horstemeyer & Risley

[57] ABSTRACT

A data communications equipment, e.g., a modem, uses a telephone number of a remote endpoint to retrieve an associated set of stored configuration parameters. These stored configuration parameters allow the modem to quickly initialize itself and thereby significantly reduce the training interval with the remote modem. In addition, the use of the telephone number of the remote endpoint allows quick identification of modulation format, e.g., that a fax call is being established.

8 Claims, 4 Drawing Sheets

ENABLING TECHNIQUE FOR QUICKLY ESTABLISHING HIGH SPEED PSTN CONNECTIONS IN TELECOMMUTING APPLICATIONS

This application is a continuation of application Ser. No. 08/333,686, filed on Nov. 3, 1994, now abandoned.

BACKGROUND OF THE INVENTION

The present invention relates to data communications equipment, e.g., modems, and, more particularly, to the setting of communications parameters within the data communications equipment.

Today, more and more companies are allowing employees to work from home, i.e., to "telecommute." To facilitate the ability of employees to work at home, some companies provide their telecommuting employees with personal computers. The latter assist the telecommuting employee in performing their work at home as if physically at the office. For example, an employee may be able to just as easily write a report using a word processor on their personal computer at home as compared to performing the same activity at the office. As a result, the personal computer provides a degree of independence from the workplace. However, during a work day the telecommuting employee may still have the need to occasionally access additional computer resources located at the company's facilities. The telecommuting employee may make a number of such data connections during the course of a day for very short time periods to obtain a copy of a file, exchange electronic mail, reconcile databases, etc.

Any computer facility is typically accessed by the telecommuting employee via a switched data connection through the public switched telephone network (PSTN). In order to establish a switched data connection, the personal computer of the telecommuting employee includes data communications equipment, e.g., a modem, that is coupled to the PSTN. Generally, the telecommuting employee simply enters a command into the personal computer to instruct the modem to dial a telephone number associated with the computer facility. After dialing and detecting an answer tone from a far-end modem of the computer facility, both the local modem and the far-end modem perform a "hand-shaking" procedure to establish the data connection.

This "hand-shaking" procedure is performed by both modems every time a data connection is established between the telecommuting employee's home and the computer facility. As part of this "hand-shaking," or initialization, procedure, each modem performs a "training process" in which each modem evaluates the analog communications channel across which the data connection is established. This evaluation is performed so that each modem can process a received signal to correctly recover the transmitted information from the far-end. For example, each modem typically includes an equalizer to correct for "inter-symbol interference" (ISI). In order to correct for ISI, a predefined test signal is transmitted between the modems during the above-mentioned training process. Each modem evaluates the received test signal and calculates a set of parameters referred to as "tap values" for the respective equalizer.

Unfortunately, the higher the data communications speed, the longer this training interval. In particular, high-speed data modems have the characteristic of taking a significant amount of time, e.g., 10–20 seconds, to establish a data connection. Further, it is likely that in a telecommuting environment high-speed data connections will be established between a telecommuting employee and their company's computer facilities for short periods of time throughout the course of the day. This is simply because the high-speed transfer of data, i.e., information, increases productivity, and because some pc-based applications, like image transfers, require a large amount of data. Consequently, this 10–20 second training delay becomes an annoyance in a telecommuting environment. In addition, the longer it takes to establish a data connection, the more time that a particular modem of the computer facility is busy—which increases the likelihood of other telecommuting employees receiving a busy signal when they attempt to make a data connection to the computer facility of the company.

While some "fast-training" mechanisms exist in the prior art, these prior art solutions are not the complete answers in a telecommuting environment. For example, in private line networks there is a dedicated facility between each endpoint of a data connection. In such a situation, the same facility is always used so that configuration parameters, like equalizer tap values, need, generally, only be calculated once. Once calculated, these configuration parameters are stored for latter recall by each modem within each endpoint. However, in the telecommuting environment—there are no dedicated facilities—only switched facilities between each endpoint of the data connection. Similarly, in the co-pending, commonly assigned, patent application of Ken Ko entitled "Independently Switched Voice and Data Calls Using a Simultaneous Voice and Data Modem," Ser. No. 08/216,373, filed on Mar. 23, 1994, the local loop between a user and their central office is terminated between two modems—one modem within the user's home and one modem within the central office of the user. In this environment, the parameters of the dedicated local loop are measured and stored for future reference in these two modems. In fact, the central office of the user stores configuration parameters, like tap values, based upon the telephone number associated with the respective local loop. However, again, in the typical telecommuting environment—the local loop is not isolated between two modems—instead the communications path between the two data endpoints include switched facilities.

SUMMARY OF THE INVENTION

We have recognized that in a telecommuting environment a) it is likely a high-speed communications path between two data endpoints will primarily use switched facilities that are digital, and b) that the data endpoint associated the computer facility of the company will couple to the PSTN through a digital facility. Consequently, the only segment of the high-speed data connection which uses truly analog communications is the local loop between the telecommuting employee's residence and their local central office. Therefore, and in accordance with the principles of the invention, we have realized a method and apparatus that significantly reduces the training interval. In particular, a modem uses a telephone number of a remote endpoint to retrieve an associated set of stored configuration parameters. These stored configuration parameters allow the local modem to quickly initialize itself and thereby significantly reduce the training interval.

In one embodiment of the invention, a central computer facility has an all-digital connection to the PSTN via a T1, or similar, facility. The PSTN portion of the high-speed data connection also comprises a digital communications facility. This allows the modem located within the employee's residence and the modem associated with the central computer facility to use predetermined configuration parameters in establishing the data connection. In particular, the answering modem, e.g., the modem associated with the central computer facility, detects the calling party's telephone number and retrieves an associated set of stored configuration parameters. Similarly, the originating modem retrieves a similar set of stored configuration parameters as a function of the called telephone number. In this embodiment, these stored configuration parameters include tap values for the respective equalizer of each modem. These equalizer tap values reflect the effect on any received data signal of the local loop between the telecommuting employee and their central office. In addition, other configuration parameters, like speed, parity, error correction options, echo canceler taps, approximate round trip delay, usable channel bandwidth (optimum symbol rate), received signal level and any other information about the circuit which normally would require time during startup for the modem to determine by direct analysis are also set. For example, V.34 modems determine gain versus frequency (frequency response) and noise versus frequency during startup in order to select the symbol rate and transmitter pre-emphasis for the session. All of this information could be stored and then retrieved based on the phone number.

As a result, this invention provides a basis for quickly establishing high-speed data connections over PSTN circuits in a network configuration which is likely to be common in telecommuting usage. The inventive concept also makes it possible to have the number of employees who are actively using telecommuting to be much larger than the number of circuits and central site modems (just as the number of customers connected to a central office might be much larger than its maximum capacity).

DETAILED DESCRIPTION

Figure 1:
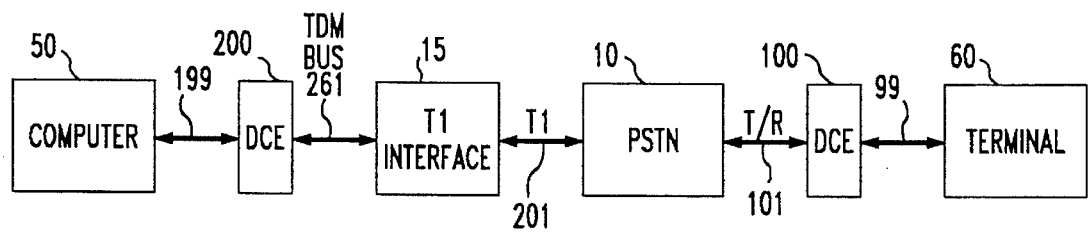
FIG. 1 is a block diagram of a point-to-point data communications system.
Figure 2:
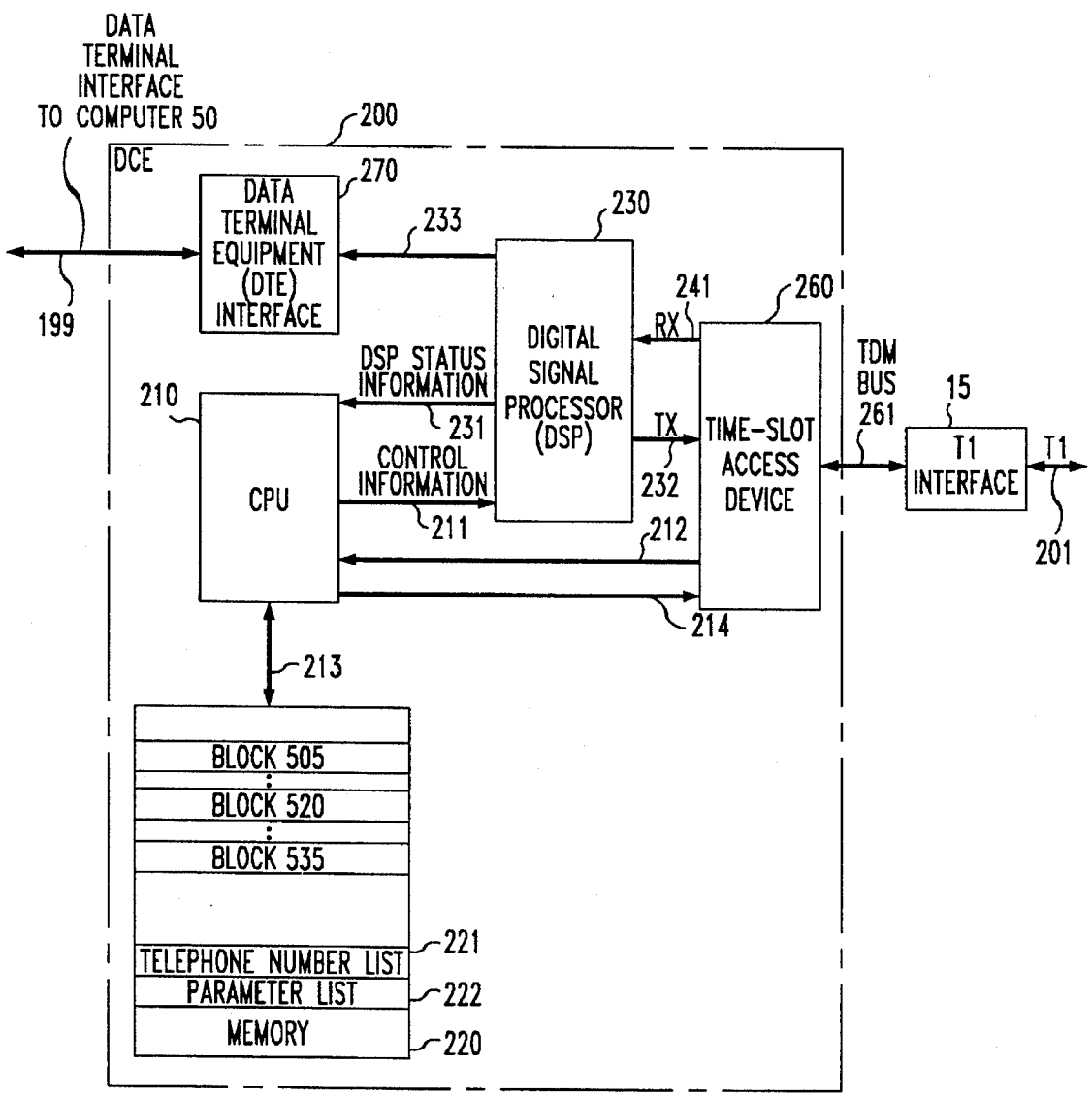
FIG. 2 is a block diagram of DCE 200, which embodies the principles of the invention and is used in the data communications system of FIG. 1.
Figure 4:
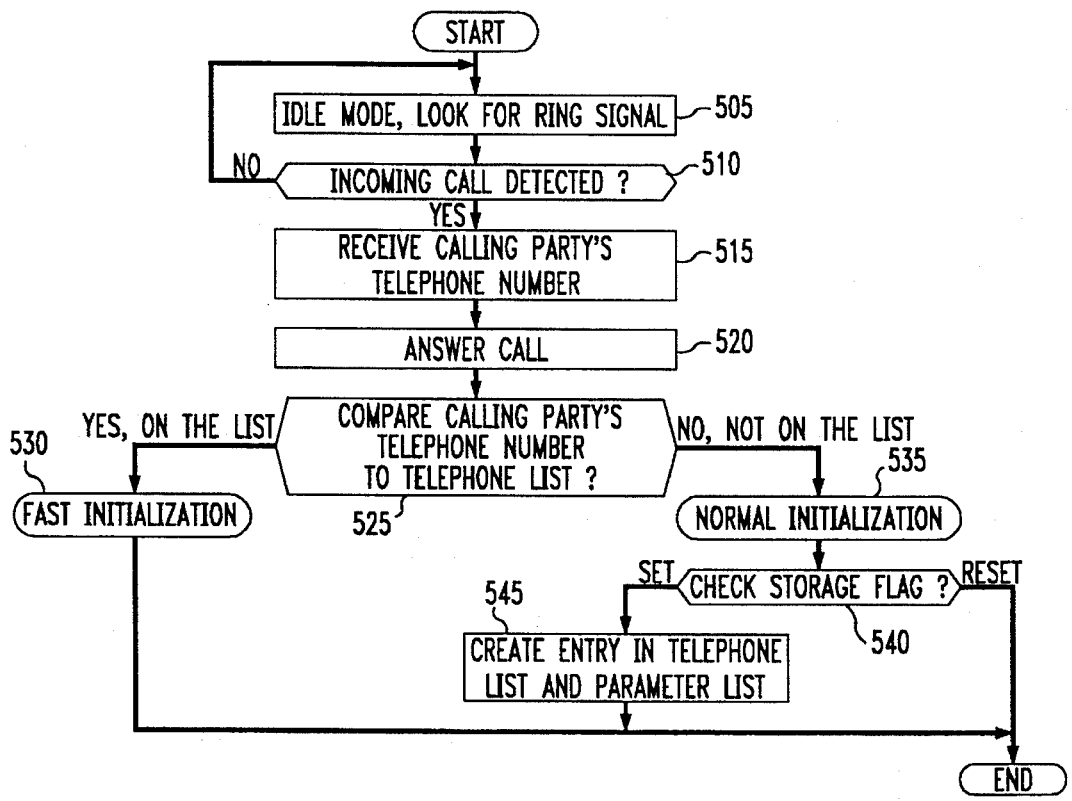
FIG. 4 is an illustrative flow diagram in accordance with the principles of the invention for use in an answering DCE.

A point-to-point data communications system for use in a telecommuting application is shown in FIG. 1. In the following example, it is assumed a calling party, e.g., the telecommuting employee, at terminal 60 initiates a telephone call in order to access computer 50 through DCE 100, PSTN 10, T1 interface 15, and DCE 200. DCE 100 and DCE 200 access PSTN 10 via lines 201 and 101, respectively. The communications channel includes lines 201, PSTN 10, and line 101. The latter is representative of a typical analog, or "tip/ring," local loop, while line 201 is representative of a digital facility, e.g., T1. In this example, line 201 terminates in T1 interface 15, which is assumed to be co-located with DCE 200. Further, it is assumed that any data call routed through PSTN 10 is over digital facilities. In particular, in this type of application it is assumed that high-speed PSTN circuits are required between any central site computing facilities and the residences of employees who are working at home. As a result, the only analog portion of the switched data connection between computer 50 and DCE 100 is over local loop 101. Therefore, and in accordance with the inventive concept, the determination of any analog line specific parameters in establishing a data connection between computer 50 and terminal 60 need only be determined once. Subsequent data connections between the same data endpoints can be quickly established via the use of a fast-initialization procedure in which configuration-specific parameters are recalled in a DCE as a function of the far-end telephone number. DCE 200, of FIG. 1, embodies the principles of the invention and is shown in more detail in FIG. 2. The components of DCE 200, other than the inventive concept, are well-known. DCE 200 comprises memory 220, CPU 210, Digital Signal Processor (DSP) 230, time-slot access device 260, and data terminal equipment interface 270. CPU 210 is a microprocessor central processing unit, which operates on, or executes, program data stored in memory 220, via path 213. Time slot access device 260 provides information to, and receives information from, T1 interface 15, via time-division-multiplexed (TDM) bus 261. T1 interface 15 terminates T1 facility 201, which conveys a T1 signal from the respective terminating central office (not show) within PSTN 10. A T1 signal includes a plurality of channels, only one of which is assigned to DCE 200. (Although not shown, T1 facility 201 is actually shared among a plurality of DCEs, of which DCE 200 is one. The other DCEs similarly provide information to, and receive information from, T1 interface 15, via TDM bus 261.) Time slot access device 260 receives signaling information from T1 interface 15, via TDM bus 261. This signaling information includes the identification of the particular time slot of TDM bus 261 that is assigned to DCE 200 and includes other information like "Automatic Number Identification" (ANI), which represents the calling party's telephone number. Time slot access device 260 both removes and inserts data into the assigned time slot of TDM bus 261. This data is a digital representation of an analog signal. In particular, data extracted by time slot access device 260 from the assigned time slot is provided as a received signal, RX, to DSP 230 via line 241. This received signal is a digitized version of the analog signal transmitted by modem 100. Conversely, DSP 230 applies signal TX to time slot access device 260, via line 232, for transmission to the far end. Like signal RX, signal TX is also a digitized analog signal. This type of modem is known in the art as a "μ-law modem." Memory 220 is representative of random access memory (RAM), and comprises a number of representative storage locations, of which a subset is shown in FIG. 2. For example, storage location 505 corresponds to that portion of memory that stores instructions and data associated with implementing step 505 of FIG. 4, described below. In addition, a portion of memory 220 includes telephone number list 221 and parameter list 222.

Figure 3:
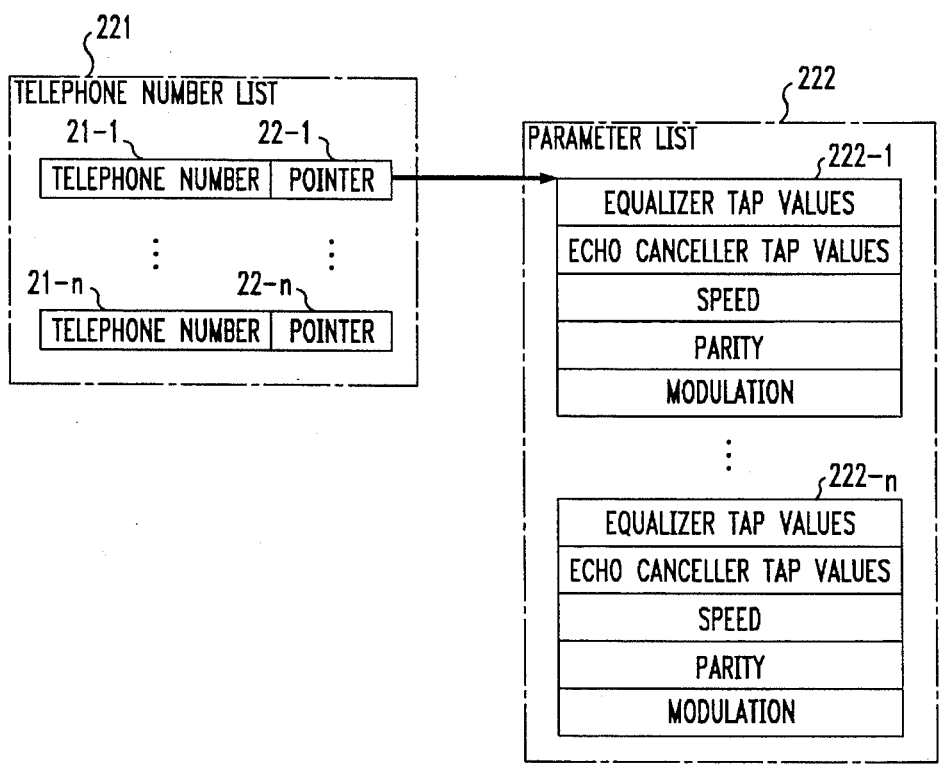
FIG. 3 is an illustration of an illustrative data structure for use in storing information in accordance with the inventive concept.

As shown in FIG. 3, telephone number list 221 includes a plurality of telephone numbers, 21-1 to 21-n. For each telephone number there is a corresponding pointer, i.e., 22-1 to 22-n. Each pointer identifies a respective set of configuration information within parameter list 222. The latter stores a plurality of sets of configuration information, 222-1 to 222-n. Each set of configuration information illustratively includes data representing equalizer tap values, echo canceller tap values, parity, speed, and modulation information. In this example, telephone number 21-1 is associated with set 222-1 via pointer 22-1. In order to facilitate understanding the inventive concept, reference can also be made to FIG. 4, which represents an illustrative method used herein to provide a "fast initialization" procedure in an answering DCE.

As noted above, it is assumed that DCE 200 is the answering DCE and begins in an idle mode in step 505. In step 510, the answering DCE detects an incoming telephone call via the above-mentioned signaling portion of TDM bus 261. The signaling information provides time slot access device 260 with the identity of the time slot in TDM bus 261 within which data from the far-end caller is to be received. In addition, the signaling information includes the calling party's ANI, which time slot access device 260 provides to CPU 210, via line 212, in step 515. CPU 210 instructs time slot access device 260, via line 214, to answer the incoming call in step 520. CPU 210 then compares, in step 521, the received ANI to each telephone number entered on telephone number list 221. If the calling party's telephone number was not found on the list by CPU 210, the latter executes a normal initialization in step 535. A normal initialization conforms to any of the standard modulation schemes, e.g., V.34. After performing the normal initialization, CPU 210 checks, in step 540, a predefined "storage flag" set within DCE 200. This "storage flag" is simply an additional parameter of DCE 200 and can be set in any number of ways, e.g., by a network manager via an "AT command mode" instruction. If the "storage flag" is set, then, in step 545, the ANI is entered into telephone number list 221 and an associated copy is made of the respective configuration parameters for storage within parameter list 222. If the "storage flag" was not set, then no entry is made for this particular telephone number.

However, if the calling party's telephone number is located in telephone number list 221, the answering DCE performs a "fast initialization" in step 530. In this "fast initialization," CPU 210 retrieves the set of configuration information associated with the received ANI via the pointer that links each telephone number entry of telephone number list 221 with a respective set of configuration information stored in parameter list 222.

Figure 5:
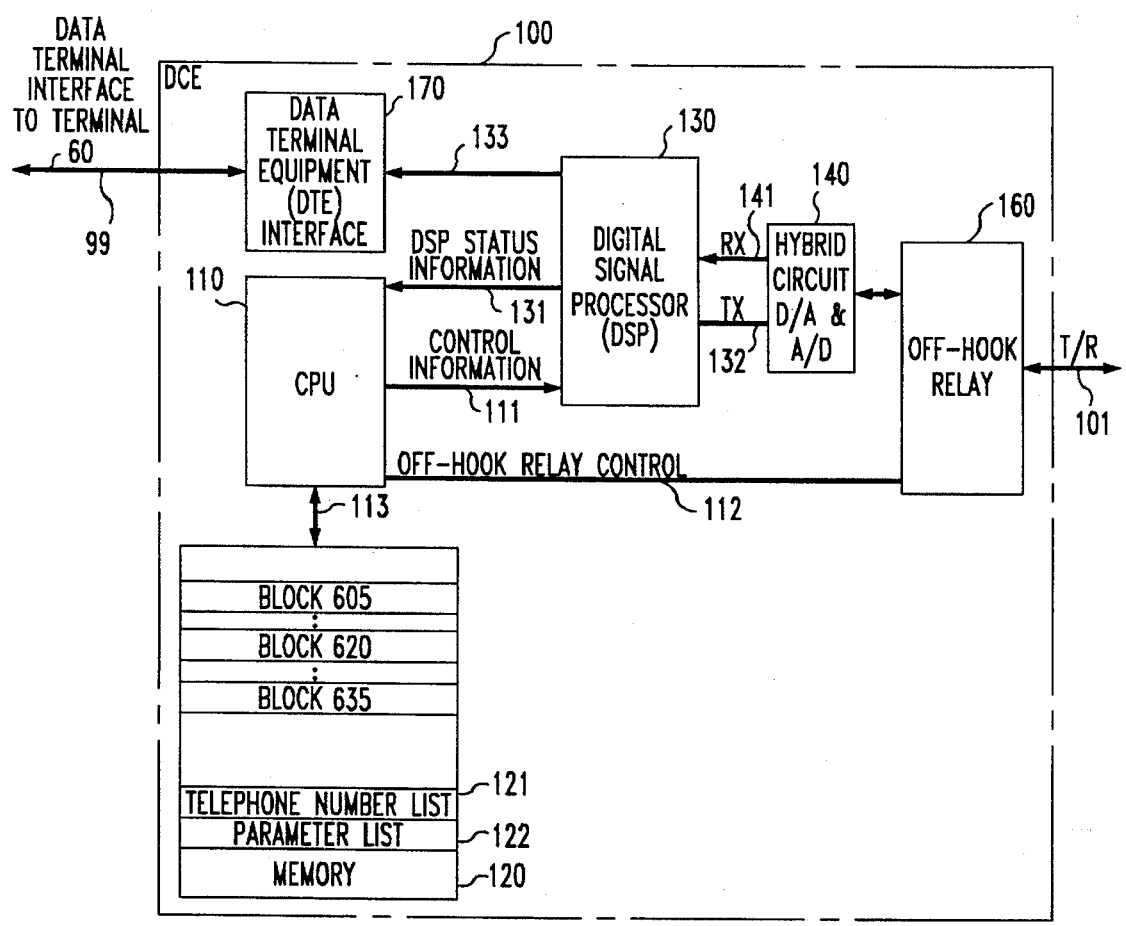
FIG. 5 is a block diagram of DCE 100, which embodies the principles of the invention and is used in the data communications system of FIG. 1.
Figure 6:
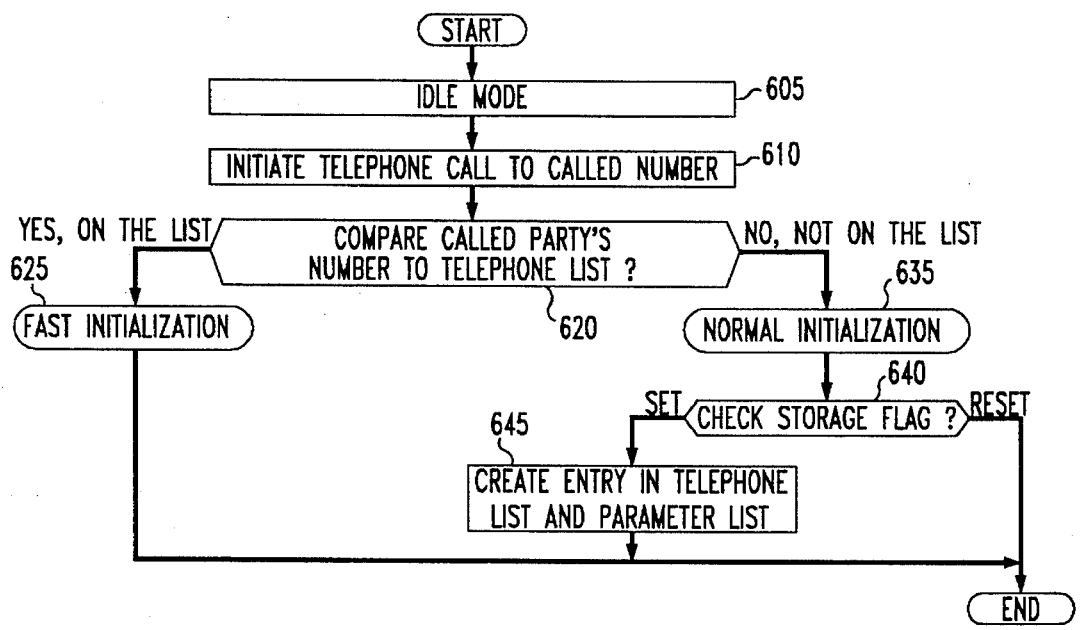
FIG. 6 is an illustrative flow diagram in accordance with the principles of the invention for use in an originating DCE.

Similar to the operation of the answering DCE, the originating DCE also checks the telephone number of the called party. DCE 100, of FIG. 1, embodies the principles of the invention and is shown in more detail in FIG. 5. The components of DCE 100, other than the inventive concept, are well-known. In this example, DCE 100 is illustratively an analog-modem and comprises memory 120, CPU 110, Digital Signal Processor (DSP) 130, hybrid circuit 140, off-hook relay 160, and data terminal equipment interface 170. CPU 110 is a microprocessor central processing unit, which operates on, or executes, program data stored in memory 120, via path 113. Memory 120 is representative of random access memory (RAM), and comprises a number of representative storage locations, of which a subset is shown in FIG. 5. Like DCE 200 described above, memory 120 includes telephone number list 121 and parameter list 122, which are assumed to have the same structure as shown in FIG. 3. In addition, for simplicity, it is assumed that hybrid 140 is not only a 2-to-4 wire converter but also includes other well-known processing circuitry like analog-to-digital converters and digital-to-analog converters for processing an incoming or outgoing signal, respectively. In order to facilitate understanding the inventive concept, reference can also be made to FIG. 6, which represents an illustrative method used herein to provide a "fast initialization" procedure in the originating DCE.

DCE 100 begins in an idle mode in step 605. In step 610, CPU 110 initiates a data call to computer 50. As is known in the art, this data call can be initiated in a number of ways. For example, a user at terminal 60 can keyboard dial using the well-known "AT-command set." As part of originating the telephone call, CPU 110 controls off-hook relay 160 to go "off-hook," as is known in the art. This couples hybrid circuit 140 to via local loop 101 over which the called party's telephone number is provided to PSTN 10. CPU 110 then compares, in step 620, the telephone number being dialed to each telephone number entered on telephone number list 121. If the called party's telephone number was not found on the list by the originating DCE, the latter executes a normal initialization in step 635. A normal initialization conforms to any of the standard modulation schemes, e.g., V.34. After performing the normal initialization, CPU 110 checks, in step 640, a predefined "storage flag" set within DCE 100. This "storage flag" is simply an additional parameter of DCE 100 and can be set in any number of ways, e.g., by the user via an "AT command mode" instruction. If the "storage flag" is set, then, in step 645, the phone number is entered into telephone number list 121 and an associated copy is made of the respective configuration parameters for storage within parameter list 122. If the "storage flag" was not set, then no entry is made for this particular telephone number.

However, if the called party's telephone number is located in telephone number list 121, the originating DCE performs a "fast initialization" in step 625. In this "fast initialization," CPU 110 retrieves the set of configuration information associated with the called party's telephone number via the pointer that links each telephone number entry of telephone number list 121 with a respective set of configuration information stored in parameter list 122.

It should be noted that it was assumed that both ends of the data connection correctly determined that either a "fast initialization" or a "normal initialization" could be performed. Although not shown for simplicity, it is assumed that if one of the DCEs determined that a fast initialization could be performed while the opposite DCE determined a "normal initialization" must be performed, a suitable error recovery procedure would be followed. For example, if the answering DCE determined that a fast initialization could be performed and subsequently detected a standard training signal indication from the opposite DCE, then the answering DCE would revert back to a normal initialization process. In addition, the inventive concept presumes a fixed relationship between a telephone number on telephone number lists 221 and 121, and a predetermined parameter—even though there is no guarantee that the predetermined parameter will not change. For example, it is assumed that equalizer tap values associated with a calling party's telephone number on telephone number list 221 will not change because of the presumption that the communications path comprises switched facilities, which are predominately digital. However, if after establishing a data connection using the fast initialization procedure the presumption is in error, DCE 200 simply executes a respective error recovery procedure. For example, if the predetermined equalizer tap values no longer apply, the error rate in a received data signal will likely increase. In this case, CPU 210 of DCE 200 monitors the error rate as known in the art. If the error rate should exceed a predetermined number DCE 200 performs a normal retrain to readjust the equalizer tap values.

In the above example, it was assumed that a telecommuting employee originated the telephone call to computer 50. However, it may be the case that computer 50 initiates the data call to terminal 60 of the telecommuting employee. In this case, the illustrative methods of FIGS. 3 and 6 would now apply to DCE 100 and DCE 200, respectively. However, in the case of DCE 100, this embodiment requires that the local exchange carrier (not shown) that provides service to the telecommuting employee via local loop 101 be equipped with what is known in the art as a "CPDN" feature. The CPDN is a caller identification number and is typically the telephone number of the calling party. An example of a CPDN central office feature can be found in Bellcore Technical Reference CLASS Feature: "Calling Number Delivery," TR-TSY-000031, Issue 3, January 1990. It is assumed that this CPDN feature is a part of the telephone service provided to the telecommuting employee by the local exchange carrier (not shown) within PSTN 10. In this case, DCE 100 detects an incoming telephone call by the receipt of two distinct signals from PSTN 10, one is a "ringing signal" as known in the art, and the second is a "modulated information signal" that is representative of CPDN information in accordance with Bellcore Calling Number Delivery Technical Reference TA-TSY-000031 mentioned above and Bellcore Technical Advisory "Voiceband Data Transmission Interface Generic Requirements," TA-NWT-000030, Issue 3, April 1992. This modulated information signal is typically multiplexed between the ringing signals. DSP 130 of DCE 100 provides the incoming CPDN number to CPU 110 via line 131. Once CPU 110 receives the calling party's telephone number from DSP 130, a comparison is made with the telephone numbers on telephone number list 121 as described above to perform either a "fast initialization" or a "normal initialization."

As described above, the inventive concept allows a DCE coupled to the PSTN network to recognize prior to starting training that long initialization times can be avoided by retrieving configuration parameters, derived on a previous connection and then stored in memory. In particular, once both the originating DCE and the answering DCE have determined that a fast initialization is possible, each respective DCE independently recalls an associated set of predefined configuration parameters from a memory device of the DCE. This set of predefined configuration information illustratively includes equalizer tap values, speed, parity, echo canceler taps, approximate round trip delay, usable channel bandwidth (optimum symbol rate), received signal level and any other information about the circuit which normally would require time during startup for the modem to determine by direct analysis, etc., and also information as to modulation format, etc. Further, upon determining that a "fast initialization" may be performed, the "a priori" stored parameter information may instruct the answering modem to immediately switch to a proprietary modulation format. Alternatively, each DCE may immediately recognize the type of data connection, e.g., that a fax call, data-only call, etc. is being established.

Figure 7:
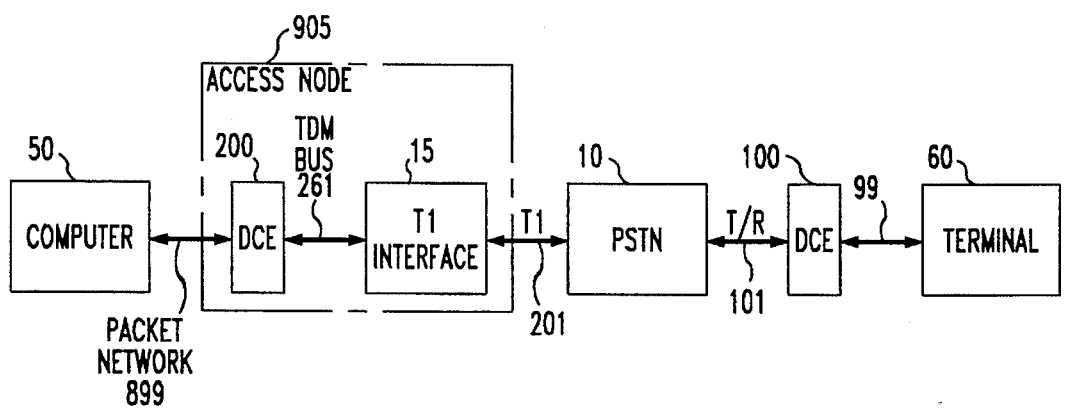
FIG. 7 is another block diagram of a data communications system embodying the principles of the invention.

Although described in the context of the point-to-point data communications system of FIG. 1, other data communications system arrangements incorporating the inventive concept are possible as, for example, shown in FIG. 7. The components of FIG. 7, other than the inventive concept, are well-known. FIG. 7 is similar to FIG. 1 except that computer 50 communicates with terminal 60 via packet network 899, and access node 905. Packet network 899 is illustratively an X.25 network that couples computer 50, and other data terminal equipment (not shown), to access node 905. In accordance with the inventive concept, access node 905 includes DCE 200 and T1 interface 15, both of which have been described above. It should be noted that since DCE 200 is a part of access node 905, another alternative embodiment is to move the configuration information from inside DCE 200 to a shared data base accessible by packet network 899. For example, when a user located at terminal 60 "dials in" to access node 50, the latter retrieves configuration information from the shared data base (not shown) via packet network 899 before establishing the data connection to terminal 60. Other than the coupling of computer 50 via a packet network, the inventive concept functions as described above.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g. a time slot access device, etc., the functions of any one or more of those building blocks can be carried out using one or more appropriate programmed processors, e.g., a digital signal processor. Further, although illustrated in the context of a T1 line, other digital facilities, e.g., that provide access to DS0 channels, can also be used. Finally, it should be noted that although DCE 200 was described in the context of an individual modem, DCE 200 could also be a part of a "modem-pool." In this instance, the configuration information associated with a telephone number would be located in a shared data base, from which configuration information is provided to each modem of the modem-pool.

What is claimed:

1. A method for use in data communications equipment apparatus for communicating with a far-end data endpoint through a switched telephone network that provides a communications channel comprising a predominately switched digital portion and a fixed analog portion, the method comprising the steps of:

retrieving a set of stored tap values associated with a telephone number representative of the far-end data endpoint; and initializing an equalizer of the data communications equipment apparatus with the retrieved set of stored tap values to compensate for the fixed analog portion of the communications channel.

2. The method of claim 1 further including the step of recovering the telephone number from a calling party identification signal from the switched telephone network.

3. A method for use in data communications equipment apparatus, the method comprising the steps of:

performing a fast initialization with an opposite data endpoint by using a set of stored parameters associated with a telephone number representative of the opposite data endpoint;

determining an error rate on a signal received from the opposite data endpoint; and if the detected error rate is greater than a predefined value, performing a standard initialization with the opposite data endpoint, where the standard initialization includes a training period to determine a new set of stored parameters associated with the telephone number.

4. The method of claim 3 including the step of recovering the telephone number from a received calling party identification signal.

5. A method for use in data communications equipment apparatus, the method comprising the steps of:

performing a fast initialization with an opposite data endpoint by using a set of stored equalizer tap values associated with a telephone number representative of the opposite data endpoint;

determining an error rate on a signal received from the opposite data endpoint; and if the detected error rate is greater than a predefined value, performing a standard initialization with the opposite data endpoint, where the standard initialization includes a training period to determine a new set of stored equalizer tap values associated with the telephone number.

6. The method of claim 5 including the step of recovering the telephone number from a received calling party identification signal.

7. A data communications equipment apparatus for use in communicating with a far-end data endpoint through a switched telephone network that provides a communications channel comprising a predominately switched digital portion and a fixed analog portion, the data communications equipment apparatus comprising:

means for receiving a calling party identification signal from the communications channel, the calling party identification signal identifying the location of the far-end data endpoint in the switched telephone network; and means responsive to the received calling party identification signal for identifying an associated set of stored tap values and for initializing an equalizer of the data communications equipment apparatus with the identified set of stored tap values to compensate for the fixed analog portion of the communications channel.

8. A data communications equipment apparatus for use in communicating with a far-end data endpoint through a switched telephone network that provides a communications channel comprising a predominately switched digital portion and a fixed analog portion, the data communications equipment apparatus comprising:

means for providing a telephone number to the switched telephone network for establishing a telephone call to the far-end data endpoint; and means responsive to the telephone number for identifying an associated set of stored tap values and for initializing an equalizer of the data communications equipment apparatus with the identified set of stored tap values to compensate for the fixed analog portion of the communications channel.

* * * * *